United States Patent
Goncalves et al.

(10) Patent No.: US 10,821,879 B1
(45) Date of Patent: Nov. 3, 2020

(54) LIGHTING DEVICE THAT PRODUCES A MAIN BEAM AND A NARROW BEAM THAT IS ORIENTABLE DEPENDING ON THE POSITION OF AN OBSTACLE DETECTED IN FRONT OF A VEHICLE

(71) Applicant: PSA AUTOMOBILES SA, Poissy (FR)

(72) Inventors: Whilk Marcelino Goncalves, Paris (FR); Lucien Stee, Ste Genevieve des Bois (FR); Gilles Moynier, Le Mans (FR); Bertrand Deguines, Vernouillet (FR)

(73) Assignee: PSA AUTOMOBILES SA, Poissy (FR)

( * ) Notice: Subject to any disclaimer, the term of this patent is extended or adjusted under 35 U.S.C. 154(b) by 0 days.

(21) Appl. No.: 16/756,338

(22) PCT Filed: Oct. 8, 2018

(86) PCT No.: PCT/FR2018/052472
§ 371 (c)(1),
(2) Date: Apr. 15, 2020

(87) PCT Pub. No.: WO2019/092334
PCT Pub. Date: May 16, 2019

(30) Foreign Application Priority Data

Nov. 8, 2017 (FR) ...................... 17 60473

(51) Int. Cl.
*B60Q 1/08* (2006.01)
*B60Q 1/20* (2006.01)
(Continued)

(52) U.S. Cl.
CPC .............. *B60Q 1/085* (2013.01); *B60Q 1/20* (2013.01); *F21S 41/635* (2018.01); *B60Q 2300/45* (2013.01); *F21W 2102/13* (2018.01)

(58) Field of Classification Search
CPC ...... B60Q 1/085; B60Q 1/20; B60Q 2300/45; F21W 2102/13; F21S 41/635
See application file for complete search history.

(56) References Cited

U.S. PATENT DOCUMENTS 9,212,799 B2 * 12/2015 Todaka .................... F21S 43/40
10,239,443 B2 * 3/2019 Kanayama .............. F21S 41/19
(Continued)

FOREIGN PATENT DOCUMENTS

DE 102005020304 A1 * 11/2006 ........... B60Q 1/0683
EP 2128521 A1 12/2009
(Continued)

OTHER PUBLICATIONS

International Search Report for PCT/FR2018/052472 dated Jan. 31, 2019.
Written Opinion for PCT/FR2018/052472 dated Jan. 31, 2019.

*Primary Examiner* — Erin Kryukova
(74) *Attorney, Agent, or Firm* — Sandberg Phoenix & von Gontard, P.C.

(57) ABSTRACT

A vehicle equipped with analysing means that analyse a zone (ZA) located in front of the vehicle is equipped with a lighting device (DE). This device (DE) comprises: —a first source (S1) that generates first photons and a reflector (RP) that reflects the first photons toward the zone (ZA) so that they form a first light beam (F1) that performs a photometric lighting function, —a second source (S2) that is installed in front of a central portion (PC) of the reflector (RP) and that generates second photons, —a lens (LF) that is inserted between the second source (S2) and the zone (ZA), that is positionable in various positions, and that forms, with the second photons, a second light beam (F2) that is narrow and that points toward a sub-zone of the zone (ZA) that depends on a set lens position, and—controlling means (MC) that set (Continued)

the position of the lens in case of detection of an obstacle in a sub-zone of known position.

8 Claims, 2 Drawing Sheets

(51) Int. Cl.
*F21S 41/63* (2018.01)
*F21W 102/13* (2018.01)

(56) References Cited

U.S. PATENT DOCUMENTS

| | | | |
|---|---|---|---|
| 10,641,451 B2* | 5/2020 | Kawai | F21S 41/36 |
| 10,655,808 B2* | 5/2020 | Takada | F21S 41/686 |
| 2006/0120094 A1* | 6/2006 | Tsukamoto | F21S 41/663 |
| | | | 362/518 |
| 2013/0343071 A1* | 12/2013 | Nagaoka | B60Q 9/008 |
| | | | 362/466 |
| 2017/0158112 A1* | 6/2017 | Mouri | F21S 41/675 |
| 2017/0158113 A1* | 6/2017 | Kanayama | F21S 41/255 |
| 2020/0062168 A1* | 2/2020 | Yuchi | B60Q 1/085 |

FOREIGN PATENT DOCUMENTS

| | | |
|---|---|---|
| EP | 2415636 A2 | 2/2012 |
| EP | 2420986 A1 | 2/2012 |
| EP | 2719942 A1 | 4/2014 |
| EP | 2754950 A1 | 7/2014 |
| JP | 2014154253 A | 8/2014 |

\* cited by examiner

LIGHTING DEVICE THAT PRODUCES A MAIN BEAM AND A NARROW BEAM THAT IS ORIENTABLE DEPENDING ON THE POSITION OF AN OBSTACLE DETECTED IN FRONT OF A VEHICLE

CROSS-REFERENCE TO RELATED APPLICATIONS

This application is the US National Stage under 35 USC § 371 of International Application No. PCT/FR2018/052472, filed 8 Oct. 2018 which claims priority to French Application No. 1760473 filed 8 Nov. 2017, both of which are incorporated herein by reference.

BACKGROUND

The invention relates to vehicles, possibly of automobile type, and more precisely to lighting devices with which such vehicles are equipped.

Some vehicles, generally of automobile type, comprise, in a front portion thereof, two main lighting devices for performing a main photometric lighting function, for example of low beam headlight (or dipped beam), fog light or high beam headlight type, and at least one auxiliary lighting device for dynamically illuminating, by means of an orientable narrow light beam, an obstacle detected in front of the vehicle by onboard analyzing means. The illumination of this obstacle (for example, a living being) is intended to draw the driver's attention to the obstacle and thus to allow the driver to have more time to perform a maneuver aimed at avoiding the obstacle. Such an auxiliary lighting device performs a function that is sometimes referred to as a "marking light," and is described for example in EP Pat. No. 2420986.

One main disadvantage of these auxiliary lighting devices lies in the fact that they add their bulk, weight, electric power supply and control wiring, and cost thereof to those of the main lighting devices, and therefore can only be installed in some vehicles that are sizeable and relatively expensive. Furthermore, the presence of auxiliary lighting device(s) in addition to the main lighting devices may adversely affect the style of the vehicle.

SUMMARY

The object of the invention is in particular to improve this situation.

To this end, a lighting device is proposed which for a vehicle comprising analyzing means that analyzes a zone located in front of the vehicle, wherein the lighting device comprising a first source that generates first photons and a reflector that reflects the generated first photons toward the zone so that they form a first light beam that performs a photometric lighting function.

This lighting device also comprises:
- a second source that is installed in front of a central portion of the reflector and that generates second photons,
- a lens that is inserted between the second source and the zone, that is positionable in various positions relative to the reflector, and that forms, with the generated second photons, a second light beam that is narrow and that points toward a sub-zone of the zone that depends on a set lens position, and
- controlling means that sets the position of the lens in case of detection of an obstacle in a sub-zone of known position relative to a marker of the vehicle.

One thus has a lighting device that performs both a main photometric lighting function and an auxiliary photometric lighting function of marking light type (with an orientable narrow light beam), such that the bulk of the lighting device is not increased significantly compared with a lighting device that is devoid of a marking light function.

The lighting device may comprise other features which can be taken separately or in combination, and in particular:
- the first source may be installed in an upper portion of the reflector;
- the second source may be installed in a vertical position relative to the central portion of the reflector;
- the controlling means may set a lens position that is remote from a place of passage of the first light beam for "stowing" the lens when the second source is not generating second photons;
- it may comprise a support to which the lens is fixedly connected, and an electric motor that rotationally drives a spindle to which the support is fixedly connected. In this case, the controlling means sets an angular position of the spindle depending on the known position of the sub-zone and that defines the lens position;
- the photometric lighting function may be selected from among a low beam headlight function, a fog light function and a high beam headlight function.

Also proposed is a vehicle, possibly of automobile type, comprising analyzing means that analyzes a zone located in front of the vehicle, and at least one lighting device of the type presented above.

For example, this vehicle may comprise two lighting devices installed in right-hand and left-hand front portions respectively.

BRIEF DESCRIPTION OF THE FIGURES

Other characteristics and advantages of the invention will become apparent on examining the detailed description hereafter, and the accompanying drawings, in which.

DETAILED DESCRIPTION

The object of the invention is in particular to propose a lighting device DE having a main photometric lighting function and an auxiliary photometric lighting function of the marking light type, with which a vehicle V comprising analyzing means MA for analyzing a front portion of its surroundings is intended to be equipped.

Hereafter, it will be considered, by way of non-limiting example, that the vehicle V is of automobile type. It is for example a car, as illustrated non-limitatively in FIG. 1. However, the invention is not limited to this type of vehicle. It in fact relates to any type of vehicle that can travel on traffic lanes on land.

Figure 2:
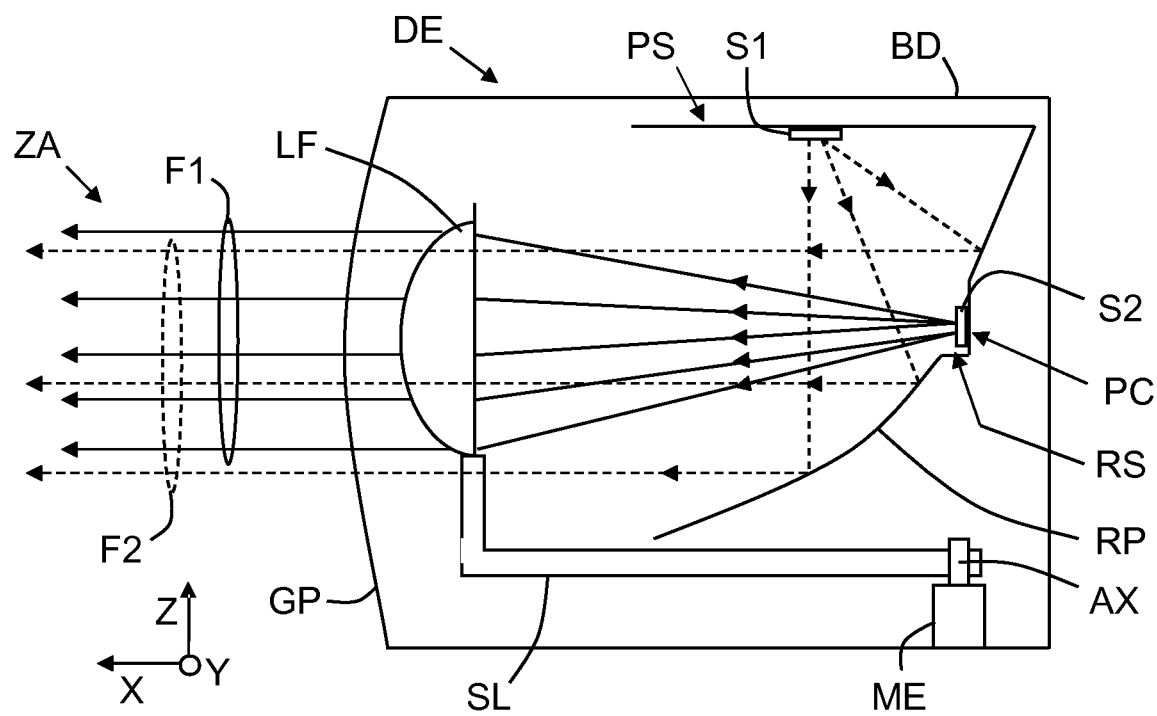
FIG. 2 illustrates schematically and functionally, in a sectional view in a vertical plane (XZ), an embodiment of a lighting device.
Figure 3:
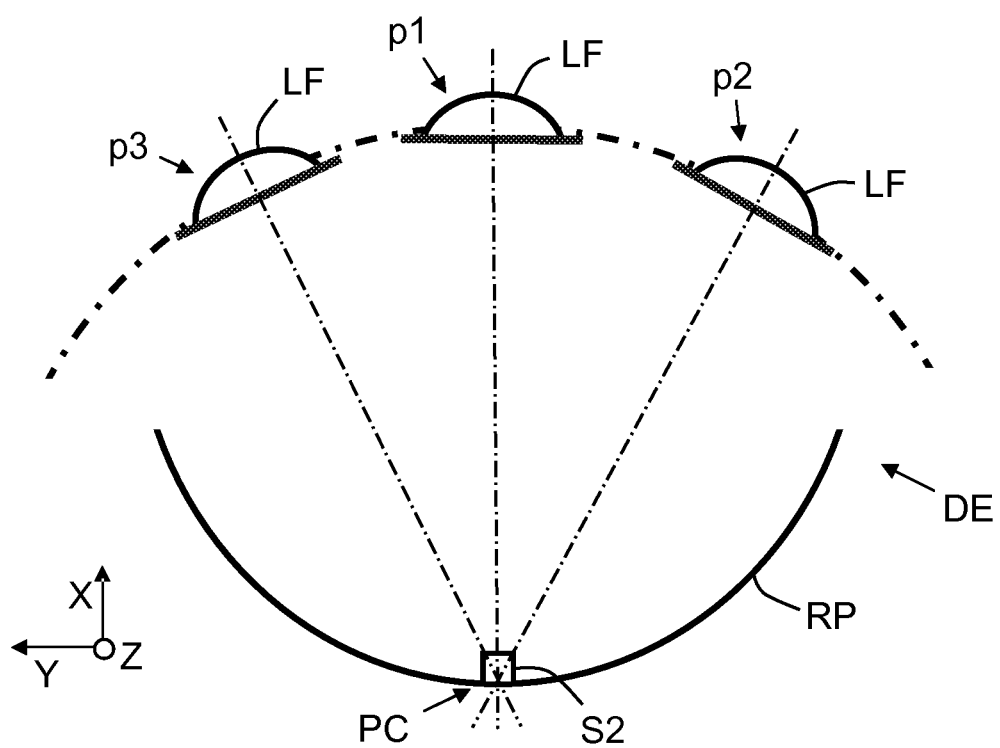
FIG. 3 illustrates schematically and functionally, in a sectional view in a horizontal plane (XY), a portion of the lighting device of FIG. 2, with its lens shown in three different lens positions.

In FIGS. 2 and 3, the direction X is a direction referred to as longitudinal because it is parallel to a longitudinal side of the vehicle, the direction Y is a direction referred to as transverse because it is perpendicular to the longitudinal sides of the vehicle V and therefore perpendicular to the longitudinal direction X, and the direction Z is a vertical direction, perpendicular to the longitudinal X and transverse Y directions.

Figure 1:
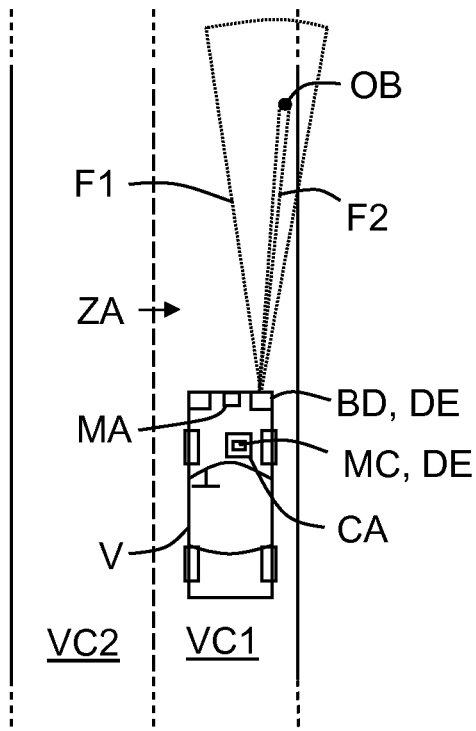
FIG. 1 illustrates schematically and functionally a road comprising a traffic lane whereon a vehicle comprising a lighting device according to the invention is traveling.

A road comprising first and second traffic lanes VC1 and VC2, respectively has been shown schematically and functionally in FIG. 1. In the first traffic lane VC1 there is a traveling vehicle V comprising analyzing means MA for analyzing the surroundings and at least one lighting device DE.

The analyzing means MA of the vehicle V is capable of, at least, of acquiring and analyzing data representative of a zone ZA located in front of the vehicle in order to detect obstacles OB, and in particular living beings (human and animal), and to estimate the relative positions of the obstacle OB relative to a reference point attached to the vehicle V. The analyzing means MA may, for example, comprise at least one digital camera. However, it might comprise at least one infrared camera or at least one radar or even at least one scanning laser.

As illustrated in FIG. 1, a lighting device DE is installed in a front portion of a vehicle V. Here, the lighting device is installed in the right-hand front portion of the vehicle V. However, it could be installed in the left-hand front portion of the vehicle V. It will be noted that the vehicle V could also comprise two lighting devices DE that are installed in right-hand and left-hand front portions of the vehicle respectively. A lighting device DE could be also installed in a central front portion of the vehicle V (for example in the radiator grille).

As illustrated in FIG. 2, alighting device DE comprises at least first S1 and second S2 photon sources, a reflector RP, alens LF and controlling means MC.

At least the first S1 and second S2 photon sources, the reflector RP and the lens LF are installed in an internal space that is delimited by a housing BD and by a transparent protective glass GP that is located at the interface with the exterior and through which the photons exit.

The first source S1 generates first photons in the direction of the reflector RP (as shown in broken lines in FIG. 2).

This first source S1 comprises, for example, at least one light-emitting diode (or LED). As a variant, it could comprise at least one laser diode or a gas laser or alternatively a lamp (or bulb).

It will be noted that this first source S1 can be mounted on a radiator intended to promote the dissipation of the heat the first source produces when generating first photons.

It will also be noted that in the example non-limitingly illustrated in FIG. 2 the first source S1 is installed in an upper portion PS of the reflector RP. However, this is not obligatory. In fact, in one variant the first source could be installed in a lower portion of the reflector RP.

The reflector RP is arranged so as to reflect the first photons, generated by the first source S1, toward the protective glass GP and the zone ZA, so that they form a first light beam F1 that performs what is referred to as a main photometric lighting function.

For example, this main photometric lighting function may be selected from among a low beam headlight function (or dipped beam), a fog light function and a high beam headlight function. In this case, the lighting device DE constitutes a front headlight (or headlamp) of the vehicle.

The reflector RP may, for example, define what the person skilled in the art calls a complex surface, having a base in the form of a parabola. Such a surface may, for example, be formed by sectors of generally rectangular shape.

The second source S2 is installed in front of a central portion PC of the reflector RP and generates second photons in the direction of the lens LF (as shown in unbroken lines in FIG. 2).

This second source S2 comprises, for example, at least one light-emitting diode (or LED). As a variant, the second source could comprise at least one laser diode or a gas laser or alternatively a lamp (or bulb). When the second source S2 comprises a plurality of light-emitting diodes, the LEDs are preferably substantially aligned in the vertical direction Z. In this case, the second source S2 is installed in a vertical position relative to the central portion PC of the reflector RP.

It will be noted that this second source S2 can be mounted on a radiator intended to promote the dissipation of the heat that the second source produces when generating second photons.

It will also be noted that the reflector RP may be arranged so that its central portion PC does not contribute to reflecting the first photons. It will be understood in fact that the presence of the second source S2 in front of this central portion PC permanently prevents the center portion PC from performing a reflection function.

Furthermore, and as illustrated non-limitatively in FIG. 2, the central portion PC may be arranged so as to define a recess RS that accommodates the second source S2. In this case at least, the second source S2 may be fixedly connected to the central portion PC.

The lens LF is inserted between the second source S2 and the zone ZA, upstream from the protective glass GP relative to the direction of propagation of the photons heading toward the outside. This lens LF is positionable in different positions pk relative to the reflector RP, and with the second photons that are generated by the second source S2, forms a second light beam F2 that is narrow and that points toward a sub-zone of the zone ZA that depends on a lens position pk set by the controlling means MC.

The lens LF is for example of the aspheric plano-convex type.

The second source S2 and the lens LF therefore together perform an auxiliary photometric lighting function of the marking light type.

The controlling means MC is arranged so as to set the lens position pk in the event of an obstacle OB being detected in a sub-zone of the zone ZA, the position of which relative to the aforementioned reference point of the vehicle V is known. The latter position is supplied by the analyzing means MA for the surroundings.

Thus, as soon as the light level outside the vehicle V is below a predefined threshold and an obstacle OB is detected in the zone ZA at a certain position, the controlling means MC sets a lens position pk that is intended to allow a second light beam F2 to be formed that is narrow and that points toward the sub-zone of the zone ZA that comprises the position of the detected obstacle OB (see FIG. 1). The lens LF is then immediately moved into this lens position pk so that the second light beam F2 illuminates this sub-zone and hence the obstacle OB that is in the sub-zone.

There are schematically illustrated in FIG. 3 three different non-limiting examples of lens positions pk (here k=1 to 3), making it possible respectively to illuminate an obstacle detected in three different positions in front of the vehicle VA. In this example, the lens LF moves angularly in an arc of a circle shown by dot-dash lines.

It will be noted that in order for the lens LF not to intercept all or part of the first light beam F1 in some of its lens positions pk that are possible in operation, it is advantageous for the controlling means MC to set a lens position pk remote from the place of passage of this first light beam F1 for "stowing" the lens LF when the second source S2 is not generating second photons. It will be understood that this makes it possible to "stow" the lens LF when the marking light function is not being used.

The lens LF may be displaced in different ways, and in particular by means of a support SL and an electric motor ME. More precisely, and as illustrated non-limitatively in FIG. 2, the lighting device DE may comprise a support SL to which the lens LF is fixedly connected, and an electric motor ME that rotationally drives a spindle AX to which the support SL is fixedly connected. In this case, the controlling means MC sets an angular position of the spindle AX depending on the known position of the sub-zone containing the detected obstacle OB and that defines the lens position pk. It will be understood that once the controlling means MC has set an angular position of the spindle AX that is adapted to the known position of this obstacle OB, the controlling means immediately triggers the moving of the spindle AX into this angular position, which simultaneously moves the lens LF into a lens position pk that enables the second light beam F2 to illuminate the obstacle OB.

The electric motor ME may, for example, be of stepper type.

Furthermore, in the example illustrated non-limitatively in FIG. 2 the support SL passes below the reflector RP, but in one variant it could pass above the reflector RP.

It will also be noted that in the example illustrated non-limitatively in FIGS. 1 and 2 the controlling means MC is installed in a computer CA of the vehicle V that may perform at least one other function. However, the controlling means MC might comprise its own computer and possibly be accommodated in the housing BD. Consequently, the controlling means MC may be in the form of software modules (or program units or alternatively software), or a combination of software modules and electric or electronic components (or hardware).

As seen, the lighting device DE, in a completely integrated manner, performs not only a main photometric lighting function, but also an auxiliary photometric lighting function of the marking light type. Consequently, it has a bulk and weight that is not very much greater than that of a lighting device that is devoid of a marking light function. Furthermore, this integration of the two photometric functions in one and the same lighting device DE makes it possible to use common electric power supply and control wiring for these two photometric functions, and not to adversely affect the style of the vehicle.

The invention claimed is:

1. A lighting device for a vehicle, the vehicle comprising analyzing means that analyzes a zone located in front of the vehicle, said lighting device comprising a first source that generates first photons and a reflector that reflects said generated first photons toward said zone so that said first photons form a first light beam that performs a photometric lighting function, said lighting device further comprising i) a second source positioned in front of a central portion of said reflector and that generates second photons, ii) a lens positioned between said second source and said zone and which is positionable in various positions relative to said reflector, said second source, generating, with said generated second photons, a second light beam that is narrower than said first light beam and that points toward a sub-zone of said zone based on a position of said lens, and iii) controlling means that sets said position of the lens in case of detection of an obstacle in a sub-zone of known position relative to a reference point of said vehicle, wherein said controlling means is adapted to set said lens in a position that is remote from a place of passage of said first light beam so as to stow said lens when said second source is not generating second photons.

2. The lighting device according to claim 1, wherein said first source is installed in an upper portion of said reflector.

3. The lighting device according to claim 1, wherein said second source is installed in a vertical position relative to said central portion of the reflector.

4. The lighting device according to claim 1, wherein said lighting device comprises a support to which said lens is fixedly connected, and an electric motor that rotationally drives a spindle to which said support is fixedly connected, and in that said controlling means sets an angular position of said spindle depending on said known position of the sub-zone and that defines said position of the lens.

5. The lighting device according to claim 1, wherein said photometric lighting function is selected from among a low beam headlight function, a fog light function and a high beam headlight function.

6. A vehicle comprising analyzing means that analyzes a zone located in front of said vehicle, wherein said vehicle comprises the lighting device according to claim 1.

7. The vehicle according to claim 6, wherein said lighting device is a first lighting device, said vehicle further comprising a second lighting device, wherein said first and second lighting devices are installed in right-hand and left-hand front portions, respectively, of said vehicle.

8. The vehicle according to claim 6, wherein said vehicle is of the automobile type.

* * * * *